Patented Mar. 29, 1932

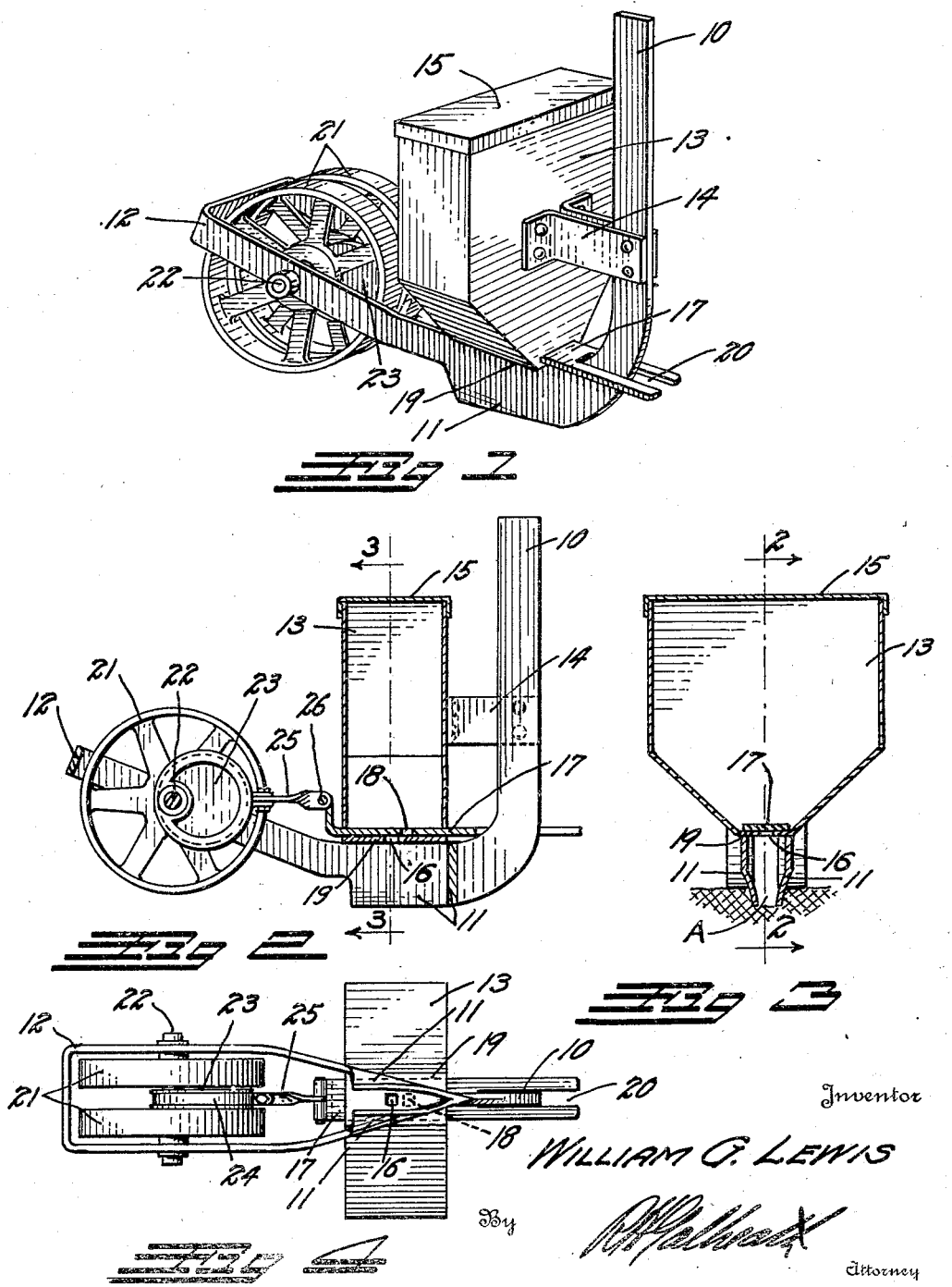
March 29, 1932. W. G. LEWIS 1,851,196
PLANTING MACHINE
Filed June 1, 1931

1,851,196

UNITED STATES PATENT OFFICE

WILLIAM G. LEWIS, OF RAWLINS, WYOMING

PLANTING MACHINE

Application filed June 1, 1931. Serial No. 541,349.

This invention relates to a seed planting machine more particularly of a type designed for attachment to a cultivator. The principal object of the invention is to provide a relatively small, compact and efficient seed planting machine, several of which can be attached to the beams of a cultivator so as to plant the seeds at spaced apart intervals along the rows. In the growing of sugar beets, cotton, and the like, the seeds are usually planted in a continuous row and the plants are later blocked so as to leave spaced groups of plants. The present invention is designed to eliminate the loss of labor and seeds occasioned by the usual blocking operation.

Other objects and advantages reside in the detail construction of the invention which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a perspective view of the invention.

Fig. 2 is a vertical longitudinal section therethrough taken on the line 2—2, Fig. 3.

Fig. 3 is a vertical lateral section taken on the line 3—3, Fig. 2.

Fig. 4 is a bottom view looking upward.

The invention comprises a post 10 designed to be attached to the beam of a cultivator by means of any of the usual cultivator blade clamps. It is, of course, not limited to attachment to a cultivator but can be applied to a drill or any other wheeled vehicle. The post 10 curves rearwardly at its lower extremity into a bifurcated V-shaped plow 11, on the rear of which, a wheel frame 12 is formed. A seed box 13 is supported upon the plow 11 and is braced by means of suitable braces 14 from the post 10. The top of the seed box 13 is closed by means of a suitable cap 15. The box 13 is hopper shaped and is formed with a flat bottom provided with a seed discharge outlet 16.

A slide member 17 passes from front to back entirely through the box 13 immediately over the bottom thereof and over the outlet 16. The slide member 17 is provided with a seed passage 18 and is so arranged that, as it is reciprocated forward and back, it will cause the seed passage 18 to pass across over the seed outlet 16. The forward extremity of the slide member 17 is bifurcated as shown at 20 so as to pass on each side of the post 10. The openings in the walls of the box through which the slide member passes serve to hold the member down upon the bottom of the box.

The slide member 17 is preferably reciprocated by means of a pair of press wheels 21 carried on a wheel shaft 22 which is journalled in the wheel frame 12. An eccentric 23 is mounted on the shaft 22 between the press wheels 21. An eccentric strap 24 surrounds the eccentric 23 and connects, by means of a connecting rod 25, with a hinge pin 26 on the forward extremity of the slide member 17.

In use, a series of the improved planters are attached to an ordinary cultivator or other wheeled vehicle so that one of the planters will travel along each of the rows spanned by the vehicle. As the vehicle is drawn along the rows, the plows 11 will open seed furrows therealong as shown at "A", Fig. 3. The press wheels 21 will rotate and reciprocate the slide member 17 so that twice during each revolution of the wheels 21 the seed passage 18 will pass over the outlet 16 so as to allow a batch of seeds to discharge directly from the seed box. The seeds are discharged relatively close to the surface of the ground and fall between the two sides of the bifurcated plow 11 so that they are protected from being scattered by the wind. The press wheels 21 follow the plow and press the two sides of the furrow back over the seeds so as to complete the planting operation.

One of the principal features of the invention resides in the fact that the seeds are discharged very close to the furrow and in the fact that they are completely protected by the sides of the plow 11. These features are very valuable in planting such seeds as cotton and beet seeds. The latter, owing to their relatively light weight and irregular contour cannot be efficiently planted by the usual grain drills, etc. They are so light and so irregular in size and shape that they do not readily fall through the valves and drill pipes and if discharged through the air without drill pipes they will be blown about the field. With the present invention, however, they are discharged in close proximity to the seed furrows so that they fall only two inches or less and during this fall they are protected by the plow sides from any side drafts or winds.

The particular slide member 17 illustrated can be varied to suit planting conditions. For instance, if it is desirable to allow the seed discharge to be open a longer period so as to discharge a longer block of seeds it is only necessary to change the slide member for one having a longer seed passage 18. The eccentric 23 can be designed to give the desired length of stroke to the slide member. The diameter of the wheels 21 governs the length of the unseeded intervals in the rows.

It is desired to call attention to the fact that, when the seed passage 18 is over the seed outlet 16, a direct opening is provided through which the seeds will fall directly from the box to the seed furrows. This arrangement makes this machine practical for use on the light, irregular shaped beet and cotton seeds which cannot be efficiently planted by a machine of the type having a valve below a discharge opening or the type having a slide to receive and carry the seeds to a discharge outlet. In the latter type of machine the seeds, owing to their lightness, will not fall from the slide and in the former type they will not fall through the valve. In the present machine, the weight of the seeds in the box above the seed passage acts to effectively force the seeds from the box.

The slide member 17 is exposed on the interior of the box 13 so that, in reciprocating back and forth, it acts as an agitator to prevent packing of the seeds above the discharge passage. The seeds are constantly maintained in a loose flowable condition.

In use, this device will save five-sixths of the beet seed and two-thirds of the cotton now being used. It will also save approximately four dollars per acre on cost of raising sugar beets and approximately one dollar per acre on cotton.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A seed planting attachment for cultivators and the like comprising: a substantially vertical attachment post; a plow member extending rearwardly from the lower extremity of said post; a wheel frame extending rearwardly from said plow member; wheels supported in said wheel frame, said wheels arranged to travel at each side of the furrow made by said plow member; a seed box supported above said plow member and provided with a bottom discharge outlet; a slide member adapted to slide across said discharge outlet and provided with a seed passage arranged to register with said outlet; and means positioned between said wheels to impart a reciprocation to said slide member.

2. A seed planting attachment for cultivators and the like comprising: a substantially vertical attachment post; a plow member extending rearwardly from the lower extremity of said post; a wheel frame extending rearwardly from said plow member; wheels supported in said wheel frame; a seed box supported above said plow member and provided with a bottom discharge outlet; a slide member adapted to slide across said discharge outlet and provided with a seed passage arranged to register with said outlet; an eccentric arranged to rotate with said wheels; an eccentric strap surrouding said eccentric; and a connecting rod connecting said eccentric strap with said slide member so as to reciprocate the latter.

In testimony whereof, I affix my signature.

WILLIAM G. LEWIS.